(12) United States Patent
Devarakonda

(10) Patent No.: US 9,114,363 B2
(45) Date of Patent: Aug. 25, 2015

(54) AFTERTREATMENT SYSTEM FOR SIMULTANEOUS EMISSIONS CONTROL IN STATIONARY RICH BURN ENGINES

(71) Applicant: General Electric Company, Schenectady, NY (US)

(72) Inventor: Maruthi N. Devarakonda, Waukesha, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 4 days.

(21) Appl. No.: 13/833,528

(22) Filed: Mar. 15, 2013

(65) Prior Publication Data

US 2014/0260213 A1 Sep. 18, 2014

(51) Int. Cl.

| F01N 3/00 | (2006.01) |
|---|---|
| F01N 3/02 | (2006.01) |
| F01N 3/10 | (2006.01) |
| F01N 3/20 | (2006.01) |
| B01D 53/94 | (2006.01) |
| F01N 3/22 | (2006.01) |
| F01N 3/30 | (2006.01) |
| F01N 9/00 | (2006.01) |

(52) U.S. Cl.
CPC ............ *B01D 53/9495* (2013.01); *F01N 3/101* (2013.01); *F01N 3/103* (2013.01); *F01N 3/106* (2013.01); *F01N 3/22* (2013.01); *F01N 3/30* (2013.01); *F01N 9/00* (2013.01); *F01N 2570/14* (2013.01); *F01N 2570/18* (2013.01); *F01N 2900/1616* (2013.01); *Y02T 10/22* (2013.01); *Y02T 10/47* (2013.01)

(58) Field of Classification Search
USPC .................... 60/286, 289, 295, 299, 300, 301
See application file for complete search history.

(56) References Cited

U.S. PATENT DOCUMENTS

| 6,722,125 | B1 | 4/2004 | Pfalzgraf | |
|---|---|---|---|---|
| 6,725,647 | B2 | 4/2004 | Pfeifer et al. | |
| 8,101,147 | B2 | 1/2012 | Andersen et al. | |
| 2004/0098979 | A1 | 5/2004 | Hammerle et al. | |
| 2008/0072578 | A1* | 3/2008 | Kumar | 60/299 |
| 2009/0260349 | A1* | 10/2009 | Gandhi et al. | 60/286 |
| 2011/0005204 | A1* | 1/2011 | Bandl-Konrad et al. | 60/276 |
| 2013/0042597 | A1* | 2/2013 | Gonze et al. | 60/274 |
| 2013/0061576 | A1* | 3/2013 | Gonze et al. | 60/286 |
| 2013/0111886 | A1* | 5/2013 | Gonze et al. | 60/286 |
| 2013/0149222 | A1* | 6/2013 | Blakeman et al. | 423/213.5 |
| 2013/0259779 | A1* | 10/2013 | Kim et al. | 423/213.7 |

FOREIGN PATENT DOCUMENTS

| DE | 19816276 A1 | 10/1999 |
|---|---|---|
| EP | 1226861 A1 | 7/2002 |
| EP | 2169193 A1 | 3/2010 |

OTHER PUBLICATIONS

EP Search Report & Written Opinion issued Jun. 24, 2014 in connection with corresponding EP Patent Application No. 14159279.0.

\* cited by examiner

*Primary Examiner* — Audrey K Bradley
*Assistant Examiner* — Dapinder Singh
(74) *Attorney, Agent, or Firm* — Fletcher Yoder, P.C.

(57) ABSTRACT

A catalyst system may include a three-way catalyst that may receive exhaust gases from an engine and convert the exhaust gases to first converted exhaust gases. An ammonia slip catalyst may receive the first converted exhaust gases and convert the first converted exhaust gases to second converted exhaust gases. A hydrocarbon oxidation catalyst may receive the second converted exhaust gases and convert the second converted exhaust gases to third converted exhaust gases.

14 Claims, 4 Drawing Sheets

AFTERTREATMENT SYSTEM FOR SIMULTANEOUS EMISSIONS CONTROL IN STATIONARY RICH BURN ENGINES

TECHNICAL FIELD

The present disclosure relates to emissions controls for internal combustion engines generally and in particular to methods and systems for simultaneous emissions control in stationary rich burn engines.

BACKGROUND

Internal combustion engines are ideally operated in a way that the combustion mixture contains air and fuel in the exact relative proportions required for a stoichiometric combustion reaction (i.e., where the fuel is burned completely.) A rich-burn engine may operate with a stoichiometric amount of fuel or a slight excess of fuel, while a lean-burn engine operates with an excess of oxygen ($O_2$) compared to the amount required for stoichiometric combustion. The operation of an internal combustion engine in lean mode may reduce throttling losses and may take advantage of higher compression ratios thereby providing improvements in performance and efficiency. Rich burn engines have the benefits of being relatively simple, reliable, stable, and adapt well to changing loads. Rich burn engines may also have lower nitrogen oxide emissions, but at the expense of increased emissions of other compounds.

In order to comply with emissions standards, many rich burn internal combustion engines utilize catalysts, such as non-selective catalytic reduction (NSCR) subsystems (commonly known as three-way catalysts). Catalysts may reduce emissions of the nitrogen oxides NO and $NO_2$ (collectively NOx), carbon monoxide (CO), ammonia ($NH_3$), methane ($CH_4$), other volatile organic compounds (VOC), and other compounds and emissions components by converting such emissions components to less toxic substances. This conversion is performed in a catalyst component using catalyzed chemical reactions. Catalysts can have high reduction efficiencies and can provide an economical means of meeting emissions standards (often expressed in terms of grams of emissions per brake horsepower hour (g/bhp-hr)). Separate catalyst components or devices may be included in the exhaust pathway of a rich burn engine to convert different emissions components. For example, one catalyst component may convert carbon monoxide and NOx while another may convert ammonia and methane.

In the oxidation process, the resulting substances generated by a catalyst component may require further conversion by a subsequent catalyst. For example, a catalyst component may convert carbon monoxide and NOx generated by an engine into ammonia, which may then be converted by another catalyst component. In a rich burn engine, controlling carbon monoxide and NOx emissions poses many challenges, one of which is operating the engine within an operating window of air/fuel proportions that allows the catalyst components to perform optimally, reducing emissions to the maximum extent possible. The air/fuel proportion window is relatively narrow, thus hindering the ability to operate the engine at a richer burn that would reduce NOx emissions.

BRIEF DESCRIPTION OF THE INVENTION

In an exemplary non-limiting embodiment, a catalyst system may include a three-way catalyst that may receive exhaust gases from an engine and convert the exhaust gases to first converted exhaust gases. An ammonia slip catalyst may receive the first converted exhaust gases and convert the first converted exhaust gases to second converted exhaust gases. A hydrocarbon oxidation catalyst may receive the second converted exhaust gases and convert the second converted exhaust gases to third converted exhaust gases.

In another exemplary non-limiting embodiment, a method is disclosed for receiving exhaust gases from an engine at a three-way catalyst and converting the exhaust gases to first converted exhaust gases. An ammonia slip catalyst may receive the first converted exhaust gases and converting the first converted exhaust gases to second converted exhaust gases. A hydrocarbon oxidation catalyst may receive the second converted exhaust gases and convert the second converted exhaust gases to third converted exhaust gases.

In another exemplary non-limiting embodiment, an engine may include an internal combustion component that generates exhaust gases. A three-way catalyst may receive the exhaust gases and convert the exhaust gases to first converted exhaust gases. An ammonia slip catalyst may receive the first converted exhaust gases and convert the first converted exhaust gases to second converted exhaust gases. A hydrocarbon oxidation catalyst may receive the second converted exhaust gases and convert the second converted exhaust gases to third converted exhaust gases.

The foregoing summary, as well as the following detailed description, is better understood when read in conjunction with the drawings. For the purpose of illustrating the claimed subject matter, there is shown in the drawings examples that illustrate various embodiments; however, the invention is not limited to the specific systems and methods disclosed.

BRIEF DESCRIPTION OF THE DRAWINGS

These and other features, aspects, and advantages of the present subject matter will become better understood when the following detailed description is read with reference to the accompanying drawings, wherein.

DETAILED DESCRIPTION OF THE INVENTION

Figure 1:
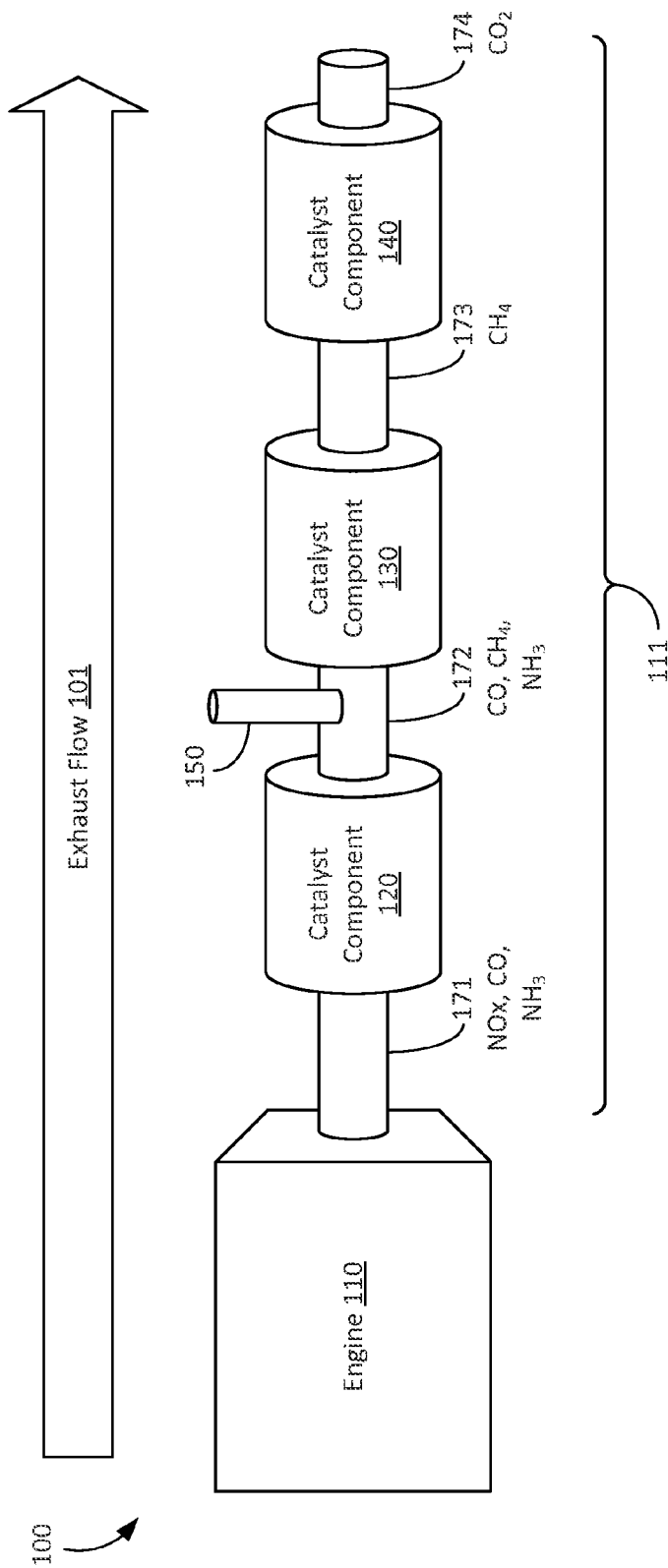
FIG. 1 is a block diagram of a non-limiting exemplary rich-burn engine and catalyst system.

FIG. 1 illustrates exemplary system 100, including engine 110 and catalyst system 111, that may be implemented according to an embodiment. Note that the entire system 100 may also be referred to as an "engine". System 100 is a simplified block diagram that will be used to explain the concepts disclosed herein, and therefore is not to be construed as setting forth any physical requirements or particular configuration required for any embodiment disclosed herein. All components, devices, systems and methods described herein may be implemented with or take any shape, form, type, or number of components, and any combination of any such components that are capable of implementing the disclosed embodiments. All such embodiments are contemplated as within the scope of the present disclosure.

Engine 110 may be any type of internal combustion engine or any device, component, system that includes an internal combustion component that generates exhaust gases. In an embodiment, engine 110 may be a natural gas fueled internal combustion engine configured to operate with a stoichiometric amount of fuel or a slight excess of fuel in proportion to oxygen (i.e., rich). Catalyst system 111 may include catalyst components 120, 130, and 140, with catalyst system midpoints 171, 172, and 173, and exhaust point 174. Catalyst system midpoints 171, 172, and 173 may be any pipe, connection, or any other component, or any section or subsection thereof, of system 100 that separates or is otherwise configured between two catalyst components (e.g., catalyst components 120, 130, and 140). Engine 110 may exhaust gases through catalyst system 111 in the direction indicated by exhaust flow 101, i.e., from engine 110 through catalyst system midpoint 171 and into catalyst component 120, from catalyst component 120 through catalyst system midpoint 172 and into catalyst component 130, etc., until gases are ultimately exhausted at exhaust point 174. Each of catalyst components 120, 130, and 140 may convert received exhaust gases to converted exhaust gases as described herein.

In an embodiment, engine 110 is a rich burn engine exhausting gases via catalyst system midpoint 171 into catalyst component 120. In this embodiment, catalyst component 120 may be a non-selective catalytic reduction (NSCR) subsystem, commonly referred to as a three-way catalyst. Where catalyst component 120 is a three-way catalyst, catalyst component 120 may reduce CO and hydrocarbon emissions using an oxidation process, while also reducing NOx emissions using a reduction process.

Gases exhausted into catalyst component 120 by engine 110 may include NOx, carbon monoxide, and ammonia. Catalyst component 120 may convert some or all of the NOx that enters catalyst component 120 into one or more other compounds, such as methane and ammonia. These generated compounds may be converted to other compounds using additional catalyst system components, as described herein. While some exhaust components entering catalyst component 120, such as carbon monoxide and ammonia, may be converted into other compounds by catalyst component 120, at least some of these compounds may be not be converted to another compound by catalyst component 120 and may be exhausted from catalyst component 120 through catalyst system midpoint 172 and into catalyst component 130.

Catalyst component 130 may be an ammonia slip catalyst that may address ammonia that is emitted from catalyst component 120 unreacted. In an embodiment, catalyst component 130 may be a dual layer catalyst with low precious metal loading and/or a zeolite coating. In such embodiments, a dual layer catalyst may be configured with two catalysts, each performing different functions, coated or otherwise configured on the same substrate. For example, in an embodiment catalyst component 130 may be an ammonia slip catalyst that has a precious metal loading and a zeolite coating on a same substrate. The precious metal loading used in catalyst component 130 may be a lower loading than a typical diesel oxidation catalyst and/or a typical three-way catalyst. Catalyst component 130 may oxidize the ammonia and carbon monoxide received from catalyst component 120 to dinitrogen ($N_2$, commonly referred to as simply "nitrogen") and carbon dioxide ($CO_2$), respectively. In an embodiment, air may be added into the exhaust flow at catalyst system midpoint 172 before the exhaust enters catalyst component 130 by injecting air into the flow with mid-bed air injection component 150. This added air may improve and/or assist in the oxidation processes performed at catalyst component 130 and/or catalyst component 140. Mid-bed air injection component 150 may be any means, component, device, or combination thereof capable of introducing additional air into the exhaust stream, and all such embodiments are contemplated as within the scope of the present disclosure.

While catalyst component 130 may successfully convert the received ammonia and carbon monoxide to less toxic compounds, other compounds, some of which may be unburnt hydrocarbons exhausted from engine 110, may be not be converted to another compound by catalyst component 130 and may be exhausted from catalyst component 130 through catalyst system midpoint 173 and into catalyst component 140. In some embodiments, methane may be included in the exhaust flow from catalyst component 130 to catalyst component 140 as a remnant of hydrocarbons not burnt by engine 110.

Catalyst component 140 may be a hydrocarbon oxidation catalyst that may address unburnt hydrocarbons and/or any other unreacted emissions that are emitted from catalyst component 130. Catalyst component 140 may contain precious metals such as platinum (Pt) and palladium (Pd). In some embodiments, the ratio of Pd to Pt may be greater than one. In an embodiment, catalyst component 140 may convert methane into carbon dioxide, as well as converting other hydrocarbons into less toxic compounds. The converted exhaust, at this point much less toxic, is exhausted from system 100 at exhaust point 174.

Figure 2:
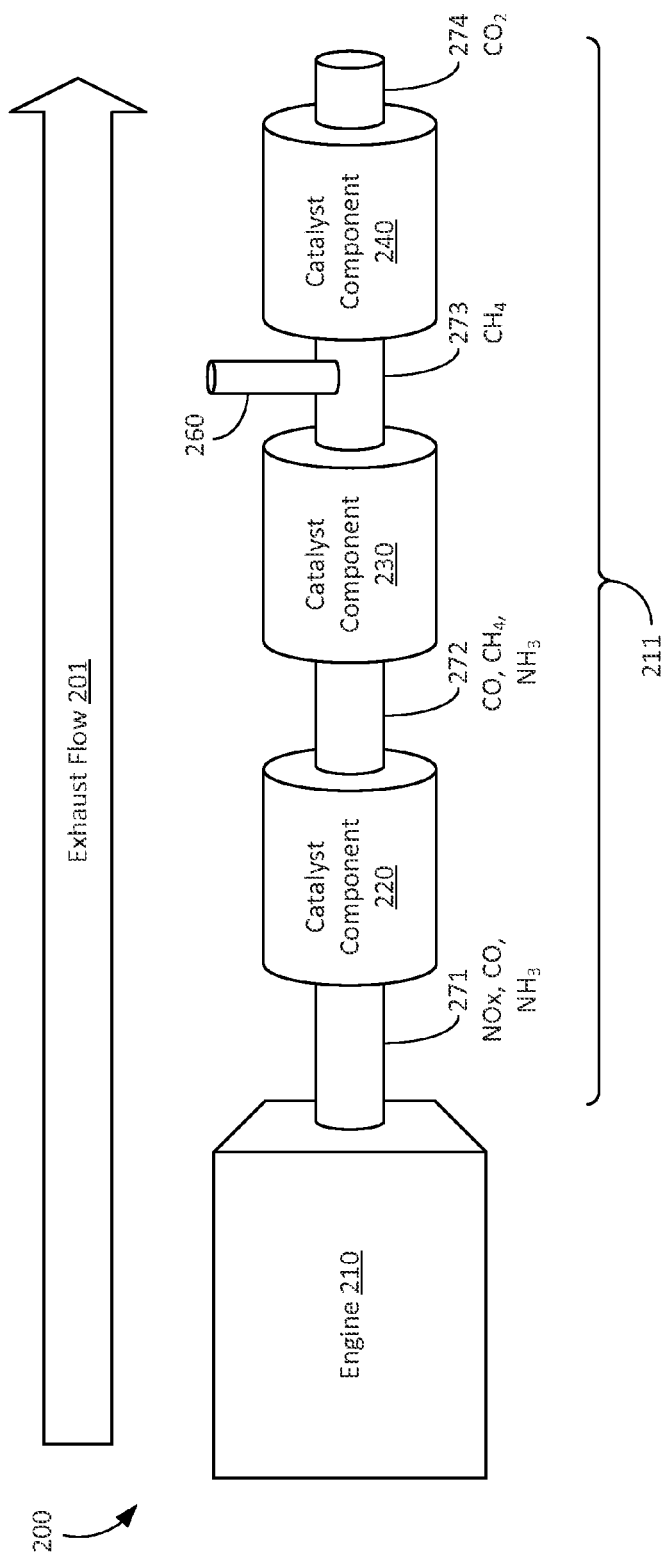
FIG. 2 is a block diagram of another non-limiting exemplary rich-burn engine and catalyst system.

FIG. 2 illustrates exemplary system 200, including engine 210 and catalyst system 211, that may be implemented according to an embodiment. Note that the entire system 200 may also be referred to as an "engine". System 200 is a simplified block diagram that will be used to explain the concepts disclosed herein, and therefore is not to be construed as setting forth any physical requirements or particular configuration required for any embodiment disclosed herein. All components, devices, systems and methods described herein may be implemented with or take any shape, form, type, or number of components, and any combination of any such components that are capable of implementing the disclosed embodiments. All such embodiments are contemplated as within the scope of the present disclosure.

Engine 210 may be any type of internal combustion engine or any device, component, system that includes an internal combustion component that generates exhaust gases. In an embodiment, engine 210 may be a natural gas fueled internal combustion engine configured to operate with a stoichiometric amount of fuel or a slight excess of fuel in proportion to oxygen (i.e., rich). Catalyst system 211 may include catalyst components 220, 230, and 240, with catalyst system midpoints 271, 272, and 273, and exhaust point 274. Catalyst system midpoints 271, 272, and 273 may be any pipe, connection, or any other component, or any section or subsection thereof, of system 200 that separates or is otherwise configured between two catalyst components (e.g., catalyst components 220, 230, and 240). Engine 210 may exhaust gases through catalyst system 211 in the direction indicated by exhaust flow 201, i.e., from engine 210 through catalyst system midpoint 271 and into catalyst component 220, from catalyst component 220 through catalyst system midpoint 272 and into catalyst component 230, etc., until gases are ultimately exhausted at exhaust point 274. Each of catalyst components 220, 230, and 240 may convert received exhaust gases to converted exhaust gases as described herein.

In an embodiment, engine 210 is a rich burn engine exhausting gases via catalyst system midpoint 271 into catalyst component 220. In this embodiment, catalyst component 220 may be a three-way catalyst as described herein. Where catalyst component 220 is a three-way catalyst, catalyst component 220 may reduce CO and hydrocarbon emissions using an oxidation process, while also reducing NOx emissions using a reduction process.

Gases exhausted into catalyst component 220 by engine 210 may include NOx, carbon monoxide, and ammonia. Catalyst component 220 may convert some or all of the NOx that enters catalyst component 220 into one or more other compounds, such as methane and ammonia. These generated compounds may be converted to other compounds using additional catalyst system components, as described herein. While some exhaust components entering catalyst component 220, such as carbon monoxide and ammonia, may be converted into other compounds by catalyst component 220, at least some of these compounds may be not be converted to another compound by catalyst component 220 and may be exhausted from catalyst component 220 through catalyst system midpoint 272 and into catalyst component 230.

Catalyst component 230 may be an ammonia slip catalyst that may address ammonia that is emitted from catalyst component 120 unreacted. In an embodiment, catalyst component 230 may be a dual layer catalyst with low precious metal loading and a zeolite coating. In such embodiments, a dual layer catalyst may be configured with two catalysts, each performing different functions, coated or otherwise configured on the same substrate. For example, in an embodiment catalyst component 230 may be an ammonia slip catalyst that has a precious metal loading and a zeolite coating on a same substrate. The precious metal loading used in catalyst component 230 may be a lower loading than a typical diesel oxidation catalyst and/or a typical three-way catalyst. Catalyst component 230 may oxidize the ammonia and carbon monoxide received from catalyst component 220 to dinitrogen ($N_2$, commonly referred to as simply "nitrogen") and carbon dioxide ($CO_2$), respectively.

While catalyst component 230 may successfully convert the received ammonia and carbon monoxide to less toxic compounds, other compounds, some of which may be unburnt hydrocarbons exhausted from engine 210, may be not be converted to another compound by catalyst component 230 and may be exhausted from catalyst component 230 through catalyst system midpoint 273 and into catalyst component 240. In some embodiments, methane may be included in the exhaust flow from catalyst component 230 to catalyst component 240 as a remnant of hydrocarbons not burnt by engine 210. In an embodiment, air may be added into the exhaust flow at catalyst system midpoint 273 before the exhaust enters catalyst component 240 by injecting air into the flow with mid-bed air injection component 260. This added air may improve and/or assist in the oxidation processes performed at catalyst component 240. Mid-bed air injection component 260 may be any means, component, device, or combination thereof capable of introducing additional air into the exhaust stream, and all such embodiments are contemplated as within the scope of the present disclosure.

Catalyst component 240 may be a hydrocarbon oxidation catalyst that may address unburnt hydrocarbons and/or any other unreacted emissions that are emitted from catalyst component 230. Catalyst component 240 may contain precious metals such as platinum (Pt) and palladium (Pd). In some embodiments, the ratio of Pd to Pt may be greater than one. In an embodiment may convert methane into carbon dioxide, as well as converting other hydrocarbons into less toxic compounds. The converted exhaust, at this point much less toxic, is exhausted from system 200 at exhaust point 274.

Figure 3:
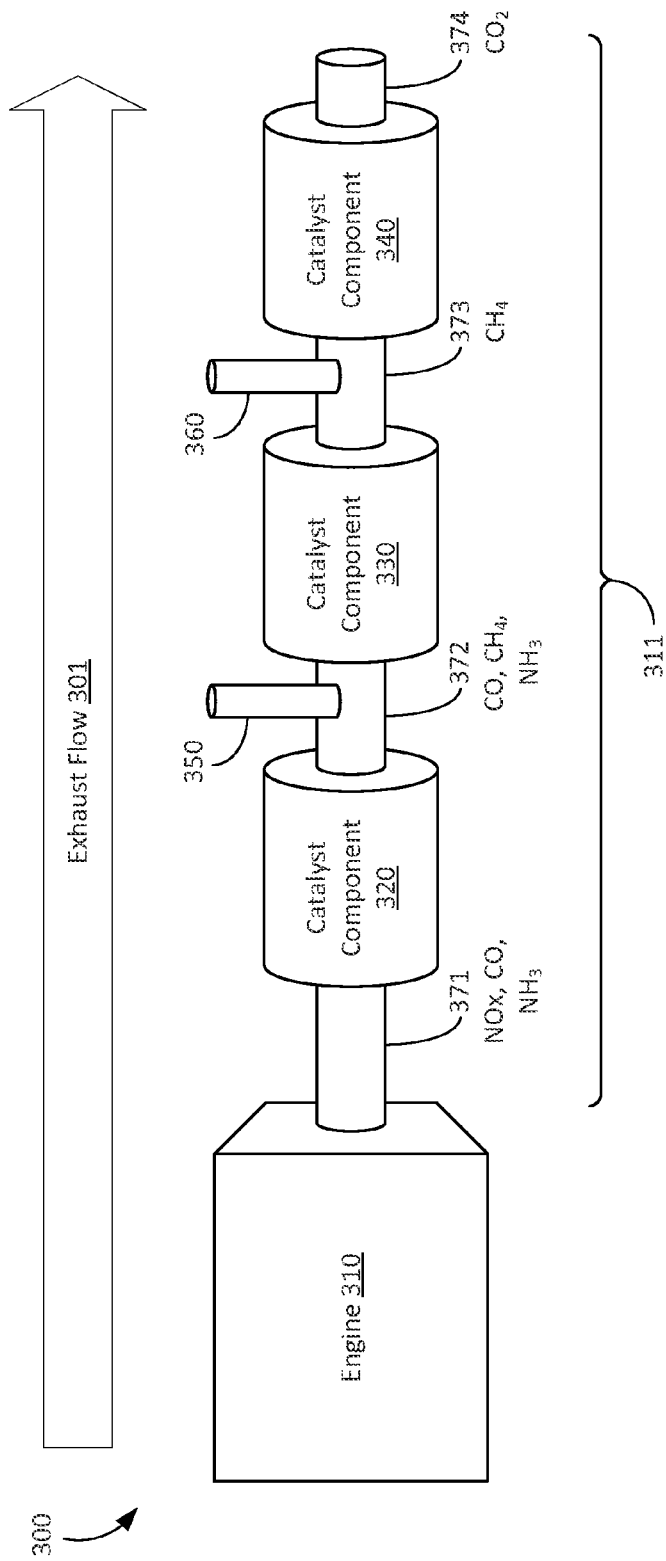
FIG. 3 is a block diagram of another non-limiting exemplary rich-burn engine and catalyst system.

FIG. 3 illustrates exemplary system 300, including engine 310 and catalyst system 311, that may be implemented according to an embodiment. Note that the entirely of system 300 may also be referred to as an "engine". System 300 is a simplified block diagram that will be used to explain the concepts disclosed herein, and therefore is not to be construed as setting forth any physical requirements or particular configuration required for any embodiment disclosed herein. All components, devices, systems and methods described herein may be implemented with or take any shape, form, type, or number of components, and any combination of any such components that are capable of implementing the disclosed embodiments. All such embodiments are contemplated as within the scope of the present disclosure.

Engine 310 may be any type of internal combustion engine or any device, component, system that includes an internal combustion component that generates exhaust gases. In an embodiment, engine 310 may be a natural gas fueled internal combustion engine configured to operate with a stoichiometric amount of fuel or a slight excess of fuel in proportion to oxygen (i.e., rich). Catalyst system 311 may include catalyst components 320, 330, and 340, with catalyst system midpoints 371, 372, and 373, and exhaust point 374. Catalyst system midpoints 371, 372, and 373 may be any pipe, connection, or any other component, or any section or subsection thereof, of system 300 that separates or is otherwise configured between two catalyst components (e.g., catalyst components 320, 330, and 340). Engine 210 may exhaust gases through catalyst system 211 in the direction indicated by exhaust flow 301, i.e., from engine 310 through catalyst system midpoint 371 and into catalyst component 320, from catalyst component 320 through catalyst system midpoint 372 and into catalyst component 330, etc., until gases are ultimately exhausted at exhaust point 374. Each of catalyst components 320, 330, and 340 may convert received exhaust gases to converted exhaust gases as described herein.

In an embodiment, engine 310 is a rich burn engine exhausting gases via catalyst system midpoint 371 into catalyst component 320. In this embodiment, catalyst component 320 may be a three-way catalyst as described herein. Where catalyst component 320 is a three-way catalyst, catalyst component 220 may reduce CO and hydrocarbon emissions using an oxidation process, while also reducing NOx emissions using a reduction process.

Gases exhausted into catalyst component 320 by engine 310 may include NOx, carbon monoxide, and ammonia. Catalyst component 320 may convert some or all of the NOx that enters catalyst component 320 into one or more other compounds, such as methane and ammonia. These generated compounds may be converted to other compounds using additional catalyst system components, as described herein. While some exhaust components entering catalyst component 320, such as carbon monoxide and ammonia, may be converted into other compounds by catalyst component 320, at least some of these compounds may be not be converted to another compound by catalyst component 320 and may be exhausted from catalyst component 320 through catalyst system midpoint 372 and into catalyst component 330.

Catalyst component 330 may be an ammonia slip catalyst that may address ammonia that is emitted from catalyst component 120 unreacted. In an embodiment, catalyst component 330 may be a dual layer catalyst with low precious metal loading and a zeolite coating. In such embodiments, a dual layer catalyst may be configured with two catalysts, each performing different functions, coated or otherwise configured on the same substrate. For example, in an embodiment catalyst component 330 may be an ammonia slip catalyst that has a precious metal loading and a zeolite coating on a same substrate. The precious metal loading used in catalyst component 330 may be a lower loading than a typical diesel oxidation catalyst and/or a typical three-way catalyst. Catalyst component 330 may oxidize the ammonia and carbon monoxide received from catalyst component 320 to dinitrogen ($N_2$, commonly referred to as simply "nitrogen") and carbon dioxide ($CO_2$), respectively. In this embodiment, air may be added into the exhaust flow at catalyst system midpoint 372 before the exhaust enters catalyst component 330 by injecting air into the flow with mid-bed air injection component 350. This added air may improve and/or assist in the oxidation processes performed at catalyst component 330 and/or catalyst component 340. Mid-bed air injection component 350 may be any means, component, device, or combination thereof capable of introducing additional air into the exhaust stream, and all such embodiments are contemplated as within the scope of the present disclosure.

While catalyst component 330 may successfully convert the received ammonia and carbon monoxide to less toxic compounds, other compounds, some of which may be unburnt hydrocarbons exhausted from engine 310, may be not be converted to another compound by catalyst component 330 and may be exhausted from catalyst component 330 through catalyst system midpoint 373 and into catalyst component 340. In some embodiments, methane may be included in the exhaust flow from catalyst component 330 to catalyst component 340 as a remnant of hydrocarbons not burnt by engine 310. In this embodiment, more air may be added into the exhaust flow at catalyst system midpoint 373 before the exhaust enters catalyst component 340 by injecting air into the flow at a second point, in an embodiment with mid-bed air injection component 360. This added air may improve and/or assist in the oxidation processes performed at catalyst component 340. Mid-bed air injection component 360 may be any means, component, device, or combination thereof capable of introducing additional air into the exhaust stream, and all such embodiments are contemplated as within the scope of the present disclosure.

Catalyst component 340 may be a hydrocarbon oxidation catalyst that may address unburnt hydrocarbons and/or any other unreacted emissions that are emitted from catalyst component 330. Catalyst component 340 may contain precious metals such as platinum (Pt) and palladium (Pd). In some embodiments, the ratio of Pd to Pt may be greater than one. In an embodiment, catalyst component 140 may convert methane into carbon dioxide, as well as converting other hydrocarbons into less toxic compounds. The converted exhaust, at this point much less toxic, is exhausted from system 300 at exhaust point 374.

Figure 4:
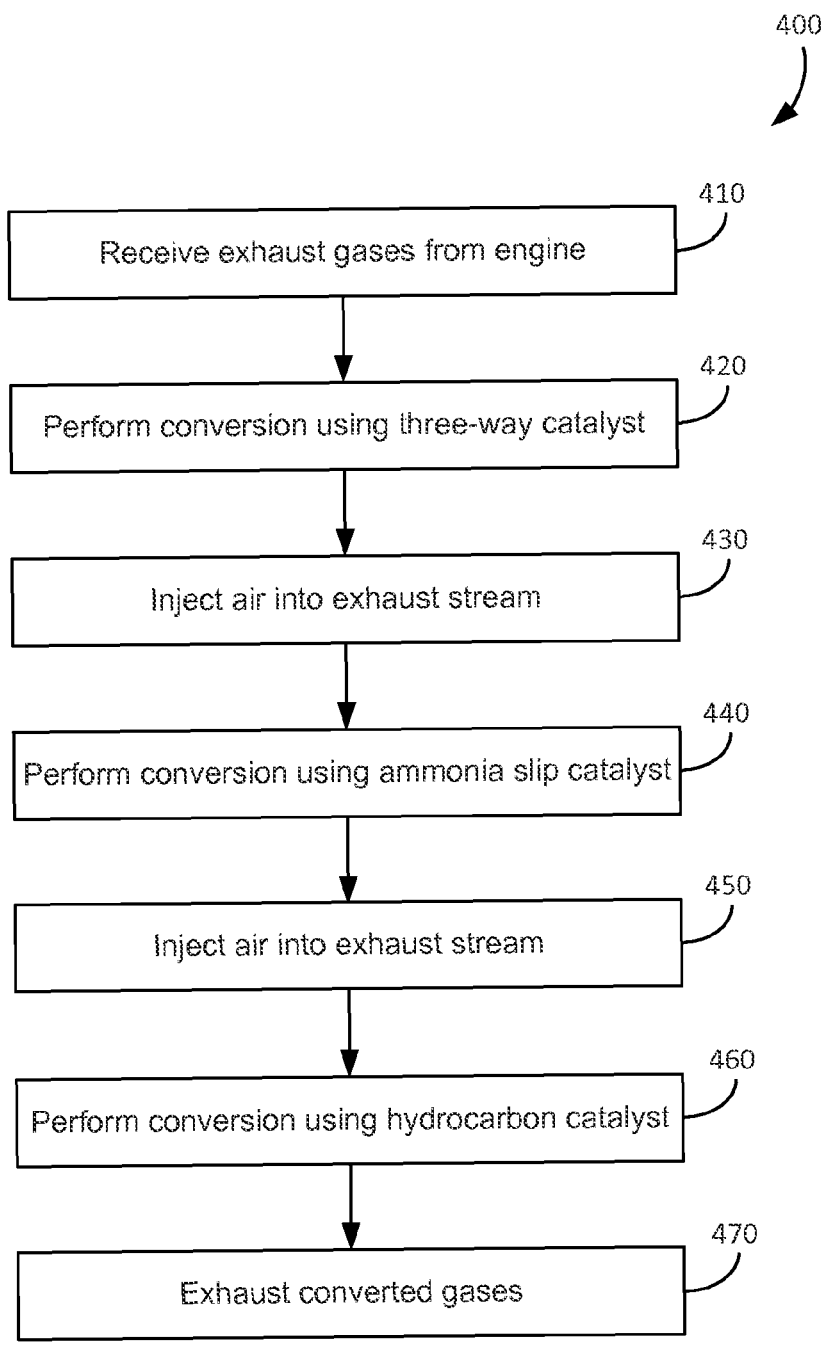
FIG. 4 is a flowchart illustrating a method of implementing a non-limiting exemplary rich-burn engine and catalyst system.

FIG. 4 illustrates exemplary, non-limiting method 400 of implementing an embodiment as disclosed herein. Method 400, and the individual actions and functions described in method 400, may be performed by any one or more devices or components, including those described herein, such as the systems illustrated in FIGS. 1-3. In an embodiment, method 400 may be performed by any other devices, components, or combinations thereof, in some embodiments in conjunction with other systems, devices and/or components. Note that any of the functions and/or actions described in regard to any of the blocks of method 400 may be performed in any order, in isolation, with a subset of other functions and/or actions described in regard to any of the other blocks of method 400 or any other method described herein, and in combination with other functions and/or actions, including those described herein and those not set forth herein. All such embodiments are contemplated as within the scope of the present disclosure.

At block 410, exhaust gases may be received at a catalyst system. At block 420, components of the received exhaust gases may be converted to less toxic components using a three-way catalyst. For example, NOx may be converted into one or more other compounds, such as methane and ammonia. While some exhaust components may be converted into other compounds at block 420, at least some of received gases may be not be converted to another compound and may be exhausted to be converted by another catalyst component.

At block 430, air may be injected into the exhaust stream exhausted by the three-way catalyst performing conversion at block 420, in an embodiment by a mid-bed air injection component. This added air may improve and/or assist in the oxidation processes performed at block 440. The mid-bed air injection component may be any means, component, device, or combination thereof capable of introducing additional air into the exhaust stream, and all such embodiments are contemplated as within the scope of the present disclosure. Note that in some embodiments, no air may be injected at this point and the function of block 430 may be omitted.

At block 440 exhaust gasses may be received and converted at an ammonia slip catalyst. The ammonia slip catalyst may be a dual layer catalyst with low precious metal loading and/or a zeolite coating. The ammonia slip catalyst may oxidize ammonia and carbon monoxide received from the three-way catalyst into dinitrogen ($N_2$, commonly referred to as simply "nitrogen") and carbon dioxide ($CO_2$), respectively.

At block 450, air may be injected into the exhaust stream exhausted by the ammonia slip catalyst performing conversion at block 440, in an embodiment by a mid-bed air injection component. This added air may improve and/or assist in the oxidation processes performed at block 460. The mid-bed air injection component may be any means, component, device, or combination thereof capable of introducing additional air into the exhaust stream, and all such embodiments are contemplated as within the scope of the present disclosure. Note that in some embodiments, no air may be injected at this point and the function of block 450 may be omitted. Embodiments that include any number of mid-bed air injection components or functions, locating anywhere within a catalyst system, as well as embodiments that do not use any mid-bed air injection, are contemplated as within the scope of the present disclosure.

At block 460 exhaust gasses may be received and converted at hydrocarbon oxidation catalyst. The hydrocarbon oxidation catalyst may convert methane into carbon dioxide, and may convert other hydrocarbons into less toxic compounds. The converted exhaust gases, at this point much less toxic, are exhausted at block 470.

The technical effect of the systems and methods set forth herein is the ability to meet all emissions regulations using a single catalyst system with a rich-burn engine. As will be appreciated by those skilled in the art, the use of the disclosed processes and systems may reduce the emissions of such engines while enabling them to run richly in a wider operating window, and thereby exploit the advantages of rich-burn engines that were previously out of reach due to emissions standards. Those skilled in the art will recognize that the disclosed catalyst systems and methods may be combined with other systems and technologies in order to achieve even greater emissions control and engine performance. All such embodiments are contemplated as within the scope of the present disclosure.

This written description uses examples to disclose the subject matter contained herein, including the best mode, and also to enable any person skilled in the art to practice the invention, including making and using any devices or systems and performing any incorporated methods. The patentable scope of this disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
    a three-way catalyst that receives exhaust gases from an engine and converts the exhaust gases to first converted exhaust gases;
    an ammonia slip catalyst that receives the first converted exhaust gases and converts the first converted exhaust gases to second converted exhaust gases;
    a hydrocarbon oxidation catalyst that receives the second converted exhaust gases and converts the second converted exhaust gases to third converted exhaust gases wherein the hydrocarbon oxidation catalyst comprises a precious metal loading comprising palladium and platinum, and a ratio of the palladium to the platinum is greater than one; and
    a mid-bed air injection system that injects air into the first converted exhaust gases upstream of the ammonia slip catalyst and injects air into the second converted exhaust gases upstream of the hydrocarbon oxidation catalyst.

2. The system of claim 1, wherein the ammonia slip catalyst comprises a precious metal loading and a zeolite coating.

3. The system of claim 2, wherein the precious metal loading comprises at least one of platinum or palladium.

4. The system of claim 1, wherein the ammonia slip catalyst converts carbon monoxide in the first converted exhaust gases to carbon dioxide.

5. The system of claim 4, wherein the ammonia slip catalyst converts ammonia in the first converted exhaust gases to nitrogen.

6. A method comprising:
    receiving exhaust gases from an engine at a three-way catalyst;
    converting, at the three-way catalyst, the exhaust gases to first converted exhaust gases;
    injecting air, via a mid-bed air injection system, into the first converted exhaust gases upstream of an ammonia slip catalyst;
    receiving the first converted exhaust gases at the ammonia slip catalyst;
    converting, at the ammonia slip catalyst, the first converted exhaust gases to second converted exhaust gases;
    injecting air, via the mid-bed air injection system, into the second converted exhaust gases upstream of the hydrocarbon oxidation catalyst;
    receiving the second converted exhaust gases at the hydrocarbon oxidation catalyst; and
    converting, at the hydrocarbon oxidation catalyst, the second converted exhaust gases to third converted exhaust gases, wherein the hydrocarbon oxidation catalyst comprises a precious metal loading comprising palladium and platinum, and a ratio of the palladium to the platinum is greater than one.

7. The method of claim 6, wherein converting, at the ammonia slip catalyst, the first converted exhaust gases to the second converted exhaust gases comprises converting carbon monoxide in the first converted exhaust gases to carbon dioxide.

8. The method of claim 6, wherein converting, at the ammonia slip catalyst, the first converted exhaust gases to the second converted exhaust gases comprises converting ammonia in the first converted exhaust gases to nitrogen.

9. The method of claim 6, wherein the ammonia slip catalyst comprises a precious metal loading and a zeolite coating.

10. The method of claim 9, wherein the precious metal loading comprises at least one of platinum or palladium.

11. A system comprising:
    an internal combustion engine that generates exhaust gases;
    a three-way catalyst that receives the exhaust gases and converts the exhaust gases to first converted exhaust gases;
    an ammonia slip catalyst that receives the first converted exhaust gases and converts the first converted exhaust gases to second converted exhaust gases; a hydrocarbon oxidation catalyst that receives the second converted exhaust gases and converts the second converted exhaust gases to third converted exhaust gases, wherein the hydrocarbon oxidation catalyst comprises a precious metal loading comprising palladium and platinum, and a ratio of the palladium to the platinum is greater than one; and
    a mid-bed air injection system that injects air into the first converted exhaust gases upstream of the ammonia slip catalyst and injects air into the second converted exhaust gases upstream of the hydrocarbon oxidation catalyst.

12. The system of claim 11, wherein the ammonia slip catalyst comprises a precious metal loading and a zeolite coating.

13. The system of claim 11, wherein the ammonia slip catalyst converts ammonia in the first converted exhaust gases to nitrogen.

14. The system of claim 11, wherein the ammonia slip catalyst converts carbon monoxide in the first converted exhaust gases to carbon dioxide.

* * * * *